UNITED STATES PATENT OFFICE.

ALBERT EMIL MILITZ, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

SOLUBLE STARCH.

941,159.   Specification of Letters Patent.   Patented Nov. 23, 1909.

No Drawing.   Application filed January 29, 1908.   Serial No. 413,284.

*To all whom it may concern:*

Be it known that I, ALBERT EMIL MILITZ, chemist, citizen of the German Empire, residing at Leverkusen, near Cologne, Germany, Kingdom of Prussia, have invented new and useful Improvements in Soluble Starch, of which the following is a specification.

The so-called "soluble starch" was hitherto prepared by treating starch with caustic alkalies, sodium peroxid, permanganate or with acids. It was, however, not possible to obtain by these processes a product which answers all demands of practical working. The treatment of starch with acids has furthermore to be carried out at a higher temperature, as dilute acids e. g. a 12 per cent. hydrochloric acid react upon starch at ordinary temperature only incompletely, and very slowly. Acetic acid does not react at all on starch at ordinary temperature.

I have now found that a new soluble starch which excels all other sorts in quality can easily be prepared by treating a cold suspension of starch in acetic acid with small quantities of mineral acids e. g. nitric acid, hydrochloric acid, sulfuric acid etc. The surprising effect of the mineral acid is probably due to catalytic action. The soluble starch thus produced being most probably an acetyl derivative of starch dissolves completely in hot water to a limpid liquid which can be kept for a long time without coagulating as do the known soluble starch preparations. The product is an excellently adhesive substance which can be used as substitute for gum arabic, tragacanth, as a thickening or finishing agent, etc.

In carrying out the new process practically I can proceed as follows, the parts being by weight; 500 parts of potato-flour are quickly introduced with continuous stirring into a mixture of 250 parts of a 98–99 per cent. acetic acid with 7½ parts of nitric acid (40° Bé.). The product of the reaction, at first a rather thin liquid solidifies after a short time to an easily triturable solid. The mixture is allowed to stand for about 24 hours, then cold water is added and the new product is filtered off, washed with cold water and dried at about 40° C. It looks like starch. It is a white amorphous powder, insoluble in cold water, but soluble in water of about 70° C. In such a solution containing about 10 to 15% it furnishes a gluelike, strongly adhesive solution, which can be kept for weeks without losing its adhesive properties. This solution does neither congeal nor coagulate. A solution of about 5% of the acetylated starch gives with iodin a violet color. After heating on the water bath a solution of about 10% of the new acetylated starch with caustic alkali, for example with 0.5 gr. $Na_2O$ to 10 gr. acetylated starch, starch cannot be recovered from this solution, nor can the formation of starch be observed during any stage of the reaction. After saponification with caustic alkali and distillation under the addition of phosphoric acid, acetic acid is obtained in the distillate. Of course other kinds or qualities of starch and other mineral acids may be employed.

I do not confine myself to the particulars given in the above example, which are merely typical and can be varied within wide limits without altering thereby the nature of this invention.

Having now described my invention and in what manner the same is to be performed, I declare that what I claim is:—

The new acetylated starch obtained from starch and acetic acid, which is a white, amorphous powder, insoluble in cold water, but dissolving in hot water to a limpid, adhesive liquid, which can be kept for weeks without losing its adhesive properties, insoluble in hot or cold acetic acid glacial, giving with iodin solution a violet color, and which is not reconverted into the original starch by the action of alkali, substantially as hereinbefore described.

In testimony whereof I have hereunto set my hand in the presence of two subscribing witnesses.

ALBERT EMIL MILITZ. [L. S.]

Witnesses:
 OTTO KÖNIG,
 WM. WASHINGTON BRUNSWICK.